United States Patent [19]

Suzuki

[11] Patent Number: 4,843,474
[45] Date of Patent: Jun. 27, 1989

[54] ELECTRONIC STILL CAMERA AND METHOD OF DETERMINING EXPOSURE TIME THEREOF

[75] Inventor: Nobuo Suzuki, Yokohama, Japan

[73] Assignee: Kabushiki Kaisha Toshiba, Kawasaki, Japan

[21] Appl. No.: 139,831

[22] Filed: Dec. 30, 1987

[30] Foreign Application Priority Data

Jan. 5, 1987 [JP] Japan .................................. 62-270

[51] Int. Cl.⁴ ............................................ H04N 5/238
[52] U.S. Cl. .................... 358/213.19; 358/228
[58] Field of Search .................. 358/213.19, 213.24, 358/909, 228

[56] References Cited

U.S. PATENT DOCUMENTS

| | | | |
|---|---|---|---|
| 3,934,161 | 1/1976 | Caywood | 307/311 |
| 4,489,350 | 12/1984 | Kimura | 358/213.19 |
| 4,516,172 | 5/1985 | Miyata et al. | 358/213.24 |
| 4,556,908 | 12/1985 | Ida | 358/213.19 |
| 4,573,077 | 2/1986 | Imai | 358/213.19 |

*Primary Examiner*—Jin F. Ng
*Assistant Examiner*—Stephen Brinich

*Attorney, Agent, or Firm*—Foley & Lardner, Schwartz, Jeffery, Schwaab, Mack, Blumenthal & Evans

[57] ABSTRACT

In an electronic still camera provided with a plurality of photosensitive pixels arranged on a two-dimensional plane, and transfer means for transferring charges produced in the photosensitive pixels, there is provided a method of precisely measuring a shutter speed at a relatively low cost. To the solid state image sensor, output terminals of the duplicate system are provided. The first terminal outputs signal charges for forming a pictorial image. The second terminal outputs signal charges for determining an exposure time. For a predetermined time after the shutter is opened, signal charges are output from the second terminal to thereby determine an exposure time. Subsequently, signal charges are output from the first terminal to form a pictorial image. At this time, only for an exposure time determined at the preceeding stage, the shutter is continuously opened to form a pictorial image. By allowing the solid state image sensor to have both the function to form a pictorial image and the function to measure an exposure time, the necessity of additionally providing an exposure meter is eliminated.

4 Claims, 4 Drawing Sheets

ELECTRONIC STILL CAMERA AND METHOD OF DETERMINING EXPOSURE TIME THEREOF

BACKGROUND OF THE INVENTION

The present invention relates to an electronic still camera, and more particularly to an electronic still camera having an automatic exposure function and a method of determining an exposure time thereof.

Recently, electronic still cameras capable of electronically taking a picture without use of film have been widely used. Such electronic still cameras form a pictorial image by a solid image sensor generally provided with a plurality of photosensitive pixels comprising photoelectronic devices and transfer means for transferring charges produced in the photosensitive pixels. Electronic still cameras ordinarily include an exposure meter incorporated therein and have an automatic exposure function to determine a shutter time on the basis of a measured result of the exposure meter.

For example, in U.S. patent application No. 031,460 (filed on Mar. 30, 1987) by the same applicant as the applicant of this application, an automatic exposure function capable of setting a suitable shutter time following changes in brightness of a subject is disclosed.

However, such a conventional electronic still camera having an automatic exposure function encounters the problems that it is expensive and that errors in setting the shutter speed occur. Namely, since the exposure meter is incorporated in the electronic still camera, a light quantity sensor dedicated to this exposure meter is required, with the result that peripheral components of this light quantity sensor becomes costly. In addition, since measurement of light quantity is conducted at a position somewhat different from an actual image pick-up surface on the solid state image sensor, there is produced a difference between an optimum exposure condition determined on the basis of a measured value of the exposure meter and an actual optimum exposure condition. Especially, since electronic still cameras have a dynamic range narrower than that of ordinary cameras using a silver salt film, if an error in setting the shutter speed occurs, this would greatly affect the quality of picture.

SUMMARY OF THE INVENTION

Therefore, an object of the present invention is to provide an electronic still camera and a method of determining an exposure time thereof capable of precisely setting the shutter speed.

The first feature of the present invention resides in an electronic still camera including: a solid state image sensor comprising a plurality of photosensitive pixels arranged on a two-dimensional plane, transfer means for transferring charges produced in the photosensitive pixels in a predetermined direction, and two terminals for outputting charges transferred by the transfer means; a shutter for controlling a light incident to the photosensitive pixels; an image signal processing unit for forming a pictorial image on the basis of charges output from the first terminal of the solid state image sensor; an image recording unit for recording the pictorial image formed in the image signal processing unit; an exposure signal processing unit for determining an exposure time on the basis of charges output from the second terminal of the solid state image sensor; and a control unit for controlling the transfer means of the solid state image sensor so as to output, from the second terminal, charges produced in the photosensitive pixels for a time period from a predetermined measurement start time after the shutter has been opened to a time at which a predetermined exposure measurement time elapses, and so as to output, from the first terminal, charges produced in the photosensitive pixels for a time period from a predetermined exposure start time subsequent thereto to a time at which an exposure time given by the exposure signal processing unit elapses.

The second feature of the present invention resides in an electronic still camera including: a solid state image sensor comprising a plurality of photosensitive pixels arranged on a two-dimensional plane, transfer means for transferring charges produced in the photosensitive pixels in a predetermined direction, and two terminals for outputting charges transferred by the transfer means; a shutter for controlling a light incident to the photosensitive pixels; an image signal processing unit for forming a pictorial image on the basis of charges output from the first terminal of the solid state image sensor; an image recording unit for recording the pictorial image formed in the image signal processing unit; an exposure signal processing unit for determining an exposure time on the basis of charges output from the second terminal of the solid state image sensor; a control unit for controlling the transfer means of the solid state image sensor so as to output, from the second terminal, charges produced in the photosensitive pixels for a time period from a predetermined measurement start time after the shutter has been opened to a time at which a predetermined exposure measurement time elapses, and so as to output, from the first terminal, charges produced in the photosensitive pixels for a time period from a predetermined exposure start time subsequent thereto to a time at which an exposure time given by the exposure signal processing unit elapses; and a display unit for displaying an exposure time determined by the exposure signal processing unit.

The third feature of the present invention resides in an electronic still cameral including: a solid state image sensor comprising a plurality of photosensitive pixels arranged on a two-dimensional plane, transfer means for transferring charges produced in the photosensitive pixels in a predetermined direction, and an output terminal for outputting the charges transferred by the transfer means; a shutter for controlling a light incident to the photosensitive pixels; an image signal processing unit for forming a pictorial image on the basis of charges output from the output terminal of the solid state image sensor; an image recording unit for recording the pictorial image formed by the image signal processing unit; an exposure signal processing unit for determining an exposure time on the basis of charges output from the output terminal of the solid state image sensor; and switching means for switching and outputting charges from the output terminal so as to output charges produced in the photosensitive pixels for a time period from a predetermined measurement start time after the shutter has been opened to a time at which a predetermined exposure measurement time elapses from the output terminal to the exposure signal processing unit, and so as to output charges produced in the photosensitive pixels for a time period from a predetermined exposure start time subsequent thereto to a time at which an exposure time determined by the exposure signal processing unit elapses from the output terminal to the image signal processing unit.

The fourth feature of the present invention resides in an electronic still camera including: a solid state image sensor comprising a plurality of photosensitive pixels arranged on a two-dimensional plane, transfer means for transferring charges produced in the photosensitive pixels in a predetermined direction, and an output terminal for outputting the charges transferred by the transfer means; a shutter for controlling a light incident to the photosensitive pixels; an image signal processing unit for forming a pictorial image on the basis of charges output from the output terminal of the solid state image sensor; an image recording unit for recording the pictorial image formed by the image signal processing unit; an exposure signal processing unit for determining an exposure time on the basis of charges output from the output terminal of the solid state image sensor; and switching means for switching and outputting charges from the output terminal so as to output charges produced in the photosensitive pixels for a time period from a predetermined measurement start time after the shutter has been opened to a time at which a predetermined exposure measurement time elapses from the output terminal to the exposure signal processing unit, and so as to output charges produced in the photosensitive pixels for a time period from a predetermined exposure start time subsequent thereto to a time at which an exposure time determined by the exposure signal processing unit elapses from the output terminal to the image signal processing unit, and a display unit for displaying an exposure time determined at the exposure signal processing unit.

The fifth feature of the present invention resides in a method of determining an exposure time in an electronic still camera comprising a plurality of photosensitive pixels arranged on a two-dimensional plane, transfer means for transferring charges in the photosensitive pixels in a predetermined direction, and a shutter for controlling a light incident to the photosensitive pixels, thus to form a pictorial image on the basis of charges transferred by the transfer means, characterized in that a quantity of charges transferred by the transfer means is detected to thereby determine an exposure time on the basis of the quantity of charges detected.

In accordance with the present invention, an electronic still camera which takes a picture using a solid state image sensor comprising a plurality of photosensitive pixels arranged on a two-dimensional plane and transfer means for transferring charges produced in the photosensitive pixels in a predetermined direction is characterized in that a pictorial image is formed by charges outputted from the solid state image sensor, and that an exposure time is determined on the basis of a quantity of charges outputted. Accordingly, this eliminates the necessity to provide an exposure meter separately, which has been required for the conventional electronic still camera, thus making it possible to precisely measure the shutter speed at a relatively low cost.

DESCRIPTION OF THE PREFERRED EMBODIMENTS

The present invention will be described in detail in connection with preferred embodiments shown in the figures.

First Embodiment

Figure 1:
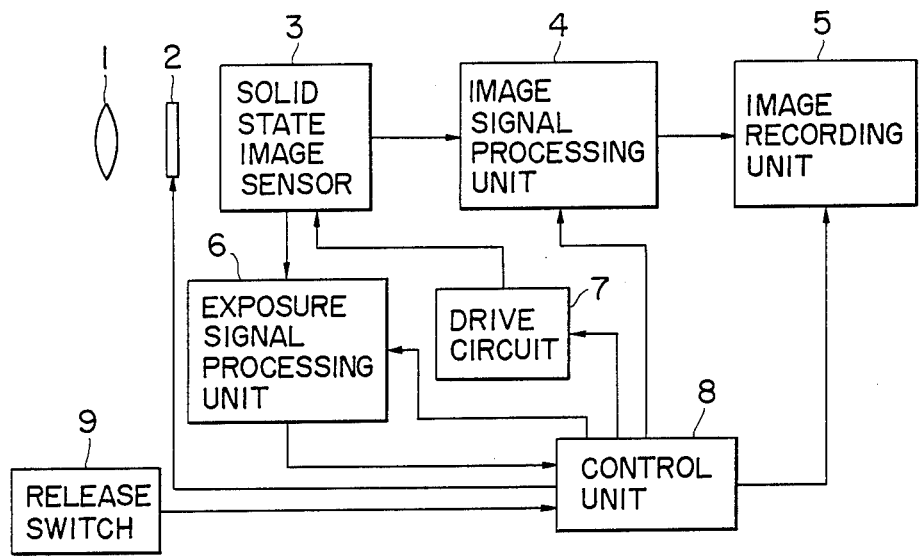
FIG. 1 is a block diagram showing the configuration of an electronic still camera according to an embodiment of the present invention.

FIG. 1 is a block diagram showing an electronic still camera according to an embodiment of the present invention. A light from an object is converged by an optical system 1 and is incident to a solid state image sensor 3 by opening a shutter 2. For the shutter 2, a mechanical shutter may be used, or an electronic shutter incorporated in the solid state image sensor 3 may be used. This solid state image sensor 3 outputs an image signal for forming a pictorial signal and an exposure signal for determining an exposure time. The image signal is delivered to an image signal processing unit 4, at which a pictorial image is formed. The pictorial image thus obtained is recorded, e.g., on a magnetic recording medium etc. at an image recording unit 5. On the other hand, the exposure signal output from the solid state image sensor 3 is delivered to an exposure signal processing unit 6, at which an optimum exposure time is determined. A drive circuit 7 is a circuit which drives the solid state image sensor 3 to control the charge read operation, the charge transfer operation and the like. A control unit 8 has a function to supervise and control the above-mentioned respective units. The control unit 8 also controls the operation for opening and closing the shutter 2 on the basis of a signal from a release switch 9. It is to be noted that the exposure signal processing unit 6 may be provided on the same semiconductor chip as the solid state image sensor 3.

Figure 2:
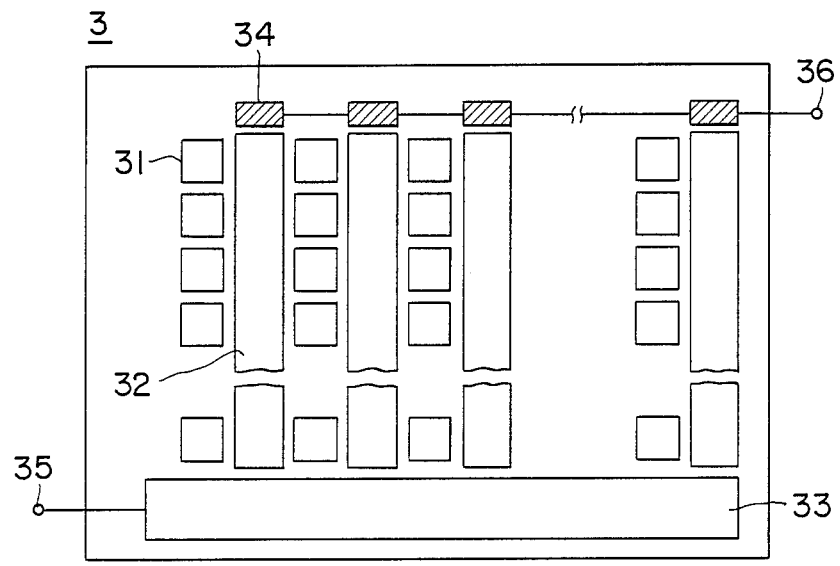
FIG. 2 is a view showing the structure of the solid state image sensor provided in the device shown in Fig. 1.

FIG. 2 is a view showing the structure of the solid state image sensor provided in the device shown in Fig. 1. This solid state sensor 3 comprises photosensitive pixels 31 comprising a plurality of photoelectric devices arranged on a two-dimensional plane, a plurality of vertical CCDs 32 which transfer charges produced in the photosensitive pixels in upper and lower directions in the figure, a horizontal CCD 33 to transfer charges, which has been transferred from the vertical CCDs 32 toward the lower side, in a left direction in the figure, a plurality of drains 34 which collect or gather charges having been transferred from the vertical CCDs 32 toward the upper side in the figure, a first terminal 35 to output charges having been transferred from the horizontal CCD 33, and a second terminal 36 to output charges having been collected at the drains 34. This solid state image sensor 3 is formed on a semiconductor substrate. For example, an implementation may be employed such that photosensitive pixels 31 as an n-type impurity region and drains 34 as an n+ impurity region are formed on a p-type semiconductor substrate, and that CCDs of the four-phase drive buried channel type are used for the vertical CCDs 32 and a CCD of the two-phase drive buried channel type is used for the horizontal CCD 33. The solid state image sensor 3 shown in FIG. 2 is characterized in that the drains 34 and the second terminal 36 are provided in the solid state image sensor of the conventional general interline transfer type. It is to be noted that the vertical CCDs 32 in this device can transfer charges not only in a lower direction of the figure but also in an upper direction thereof. The first terminal 35 serves as a terminal for delivering a signal to the image signal processing unit 4 in FIG. 1 and the second terminal 36 serves as a terminal for delivering a signal to the exposure signal processing unit 6 in Fig. 1.

Figure 3:
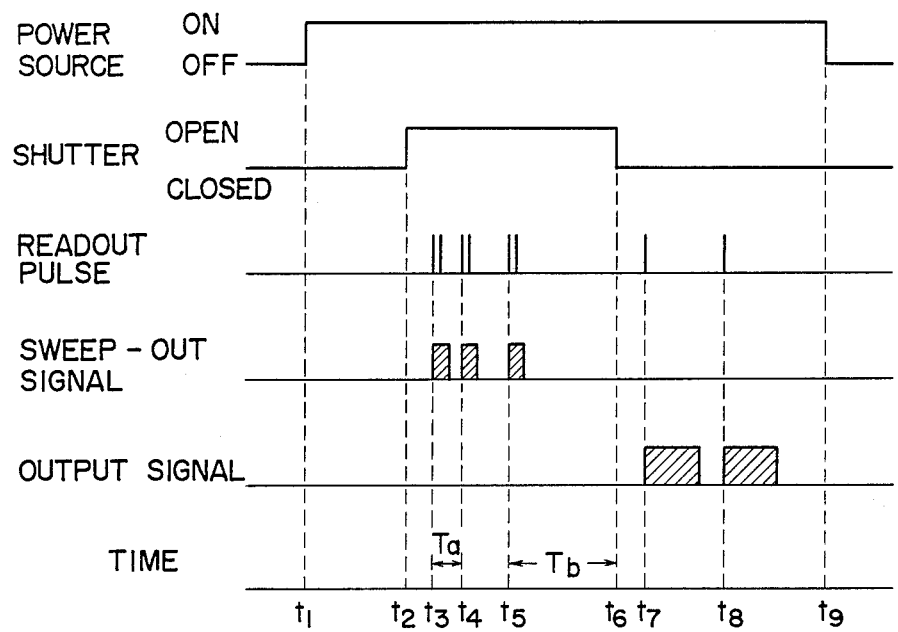
FIG. 3 is a time chart for explaining the operation of the device shown in FIG. 1.

The operation of this device will be now described with reference to the time chart in FIG. 3. Initially, a person who takes a picture sets focus and lens opening by the optical system 1. When the person who takes a picture operates the release switch 9 to give an instruction for photographing at time t1, the power source of the device is turned on. Thus, respective units are brought into the ordinary operating condition. Particularly, unnecessary charges in the photosensitive pixels 31, the vertical CCDs 32 and the horizontal CCD 33 are cleared in the solid state image sensor 3. At time t2 after a predetermined time required until the respective units are brought into the ordinary operating condition has elapsed, the shutter 2 is opened. Thus, an optical image of the object is formed on the solid state image sensor 3 and photoelectric conversion in respective pixels is initiated. Subsequently, at time t3, two readout pulses are produced, thus to read charges produced in the photosensitive pixels 31 into the vertical CCDs 32. The reason why two readout pulses are produced is that one pulse is used for reading charges from photosensitive pixels 31 of the odd rows and the other pulse is used for reading charges from photosensitive pixels 31 of the even rows. In this embodiment, the vertical CCDs 32 transfer charges in an upper direction in the figure to discharge charges having been read from the second terminal 36 through the drains 34. The charges discharged are indicated as a sweep-out signal in FIG. 3, and they are swept out without being utilized in any degree. By conducting such a sweep-out operation, a quantity of accumulated charges in respective photosensitive pixels becomes zero.

Subsequently, at time t4, two readout pulses are produced for a second time. In the same manner as at the previous time, by these pulses, charges are read into the vertical CCDs 32 and are transferred in an upper direction in the figure. Thus, they are discharged from the second terminal 36 through the drains 34. It is now assumed that a setting is made such that a time from t3 and t4 is a fixed time Ta (e.g., 100 μs) and time intervals of the two readout pulses produced at the respective time points t3 and t4 are an extremely short value (e.g., 10 μs). Under such an assumption, a quantity of charges discharged from the second terminal 36 corresponds to a total quantity of charges having been subjected to photoelectric conversion within the time Ta. This eventually becomes a value proportional to brightness of an image of the object within this time, i.e., an exposure signal. As previously described, the second terminal 36 is connected to the exposure signal processing unit 6, at which an optimum exposure time can be determined. Namely, since an exposure signal is given as a value proportional to the product of a time Ta and an average illumination, when an optimum signal level of the solid state image sensor 3 is determined in advance, it is possible to determine an optimum shutter time Tb for photographing this image.

The exposure signal processing unit 6 delivers the optimum shutter time Tb thus determined to the control unit 8. The control unit 8 instructs the drive circuit 7 to carry out a photographing work only for the optimum shutter time Tb. Namely, at time t5, the control unit 8 generates two readout pulses for a second time to discharge charges in the photosensitive pixels 31 from the second terminal 36, thus sweeping out the charges which have been accumulated. At time t6 when the optimum shutter time Tb has just elapsed, the shutter 2 is closed. Accordingly, at this time point, it can be said that charges produced for a time period of the optimum shutter time Tb are accumulated in respective photosensitive pixels.

Subsequently, the accumulated charges are transferred by an ordinary method, thus to form a pictorial image. Namely, at time t7, a readout pulse for reading accumulated charges of the photosensitive pixels of the odd rows into the vertical CCDs 32 is generated. Thus, the vertical CCDs 32 are caused to be, in turn, subjected to a transfer operation in a lower direction in the figure, to thereby transfer the charges having been read into the horizontal CCD 33 every quantity corresponding to one row. Further, by the horizontal CCD 33, the charges are transferred in a left direction in the figure to thereby output them in succession from the first terminal 35. Then, at time t8, a readout pulse for reading accumulated charges in the photosensitive pixels of the even rows is generated to similarly thereby output them from the first terminal 35. The output signals in FIG. 3 indicate these output charges.

The charges output from the first terminal 35 define a pictorial image signal in which charges produced in respective photosensitive pixels are arranged in a manner of time-series. The image signal processing unit 4 forms an image on the basis of the pictorial image signal. Then, the pictorial image thus formed is recorded at the image recording unit 5. At time t9 after a sufficient time required for completing a predetermined processing up to the image processing has completed, the power source is cut off.

It is to be noted that when a computation time for obtaining the optimum shutter time Tb is short, sweep-out operation at time t5 may be omitted. In this case, the optimum shutter time Tb is measured from time t4.

Second Embodiment

Figure 4:
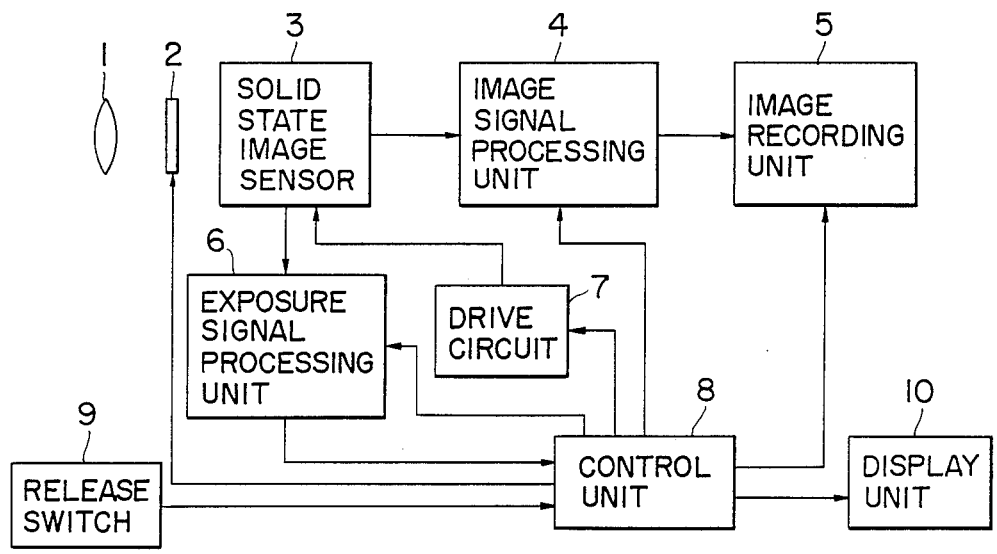
FIG. 4 is a block diagram showing the configuration of an electronic still camera according to another embodiment of the present invention.

This embodiment is characterized in that an exposure display function is added to the above-mentioned device of the first embodiment. Thus, a person who takes a picture can also utilize this electronic still camera as an exposure meter. This permits the electronic still camera to be utilized for selection of lens opening value. As shown in FIG. 4, the basic configuration of the device is such that a display unit 10 is further provided in the device shown in FIG. 1. The operation thereof will be now described.

Figure 5:
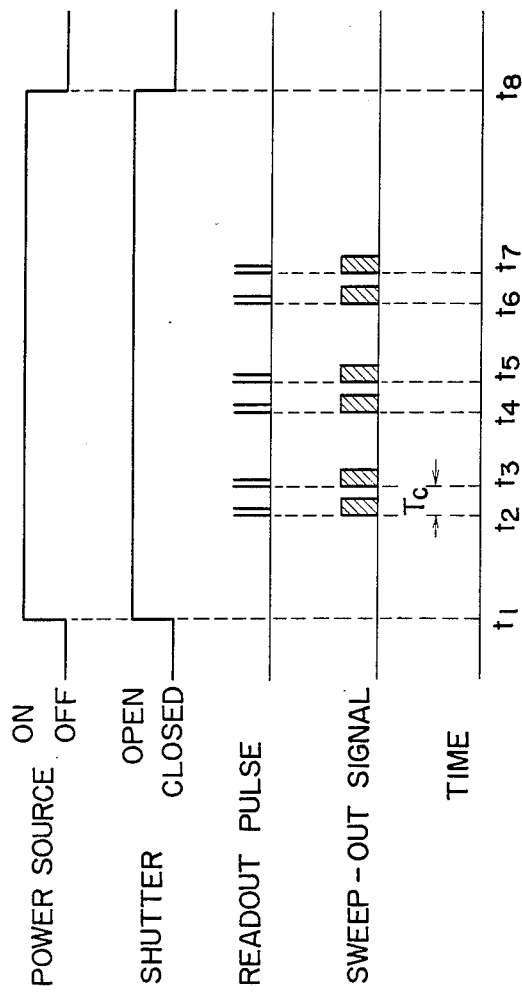
FIG. 5 is a time chart for explaining the operation of the device shown in FIG. 4.

FIG. 5 is a time chart showing the operation in the case that this device is utilized as an exposure meter. Initially, when a person who takes a picture turns on a switch for effecting the function as an exposure meter at time t1, the power source is turned on and the shutter is opened. In this case, it is preferable to deliver a power supply voltage only to portions necessary for executing the function as the exposure meter. At time t2 when a predetermined time has elapsed from the time at which the power source has been turned on whereby respective components are brought into the ordinary operating condition, two readout pulses are generated, thus allowing charges in photosensitive pixels of the even and odd columns to be swept out from the second terminal 36. The charges thus swept out are not used for measurement, but accumulated charges in respective pixels at time point of t2 become equal to zero by this sweepout operation. Subsequently, at time t3 when a predetermined time Tc has elapsed, two readout pulses are generated similarly, thus allowing charges in respective photosensitive pixels to be output from the second terminal 36. Such charges are eventually charges generated in respective photosensitive pixels within the time Tc. They are delivered to the exposure signal processing unit 6 as an exposure signal. As previously described, the optimum shutter time under the present condition can be determined on the basis of this exposure signal. Thus, the control unit 8 allows the display unit 10 to display this optimum shutter time.

As long as the switch as the exposure meter is on, the above-mentioned operation is repeated every fixed time period. Namely, by readout pulses generated at times t4 and t5, an exposure signal is obtained for a second time. At this time point, the optimum shutter time is displayed. Further, by readout pulses generated at times t6 and t7, an exposure signal is obtained for a third time. At this time point, the optimum shutter time is displayed. When the display unit 10 has an arrangement such that display is conducted within the finder, the display within the finder is updated at a predetermined time period. If the setting of the lens opening is completely the same, a value displayed is fixed. However, if the setting of the lens opening is changed, a value displayed varies accordingly. Accordingly, a person who takes a picture operates the lens opening while viewing the finder, thereby making it possible to select the value of the lens opening while making a reference to the shutter time displayed. When selection of the lens opening value is thus completed, the switch as the exposure meter is cut off at time t8. Thus, the power source is cut off, so that the shutter is closed.

Third Embodiment

While total measured quantity of charges generatd in respective photosensitive pixels is used as an exposure signal in the above-mentioned embodiments, only charges generated in photosensitive pixels positioned at a specified portion may be used as an exposure signal. Especially, it is advantageous for improvement in operation of the electronic still camera to use only charges generated in the photosensitive pixels in the vicinity of the central portion of the solid state image sensor. This is because it is ordinary that a picture is taken with a object being positioned in the vicinity of the central portion of the finder. For example, when a person within a background is photographed, it is desirable to determine the exposure with the person positioned in the center as a reference in place of the sky etc. of the background.

Figure 6:
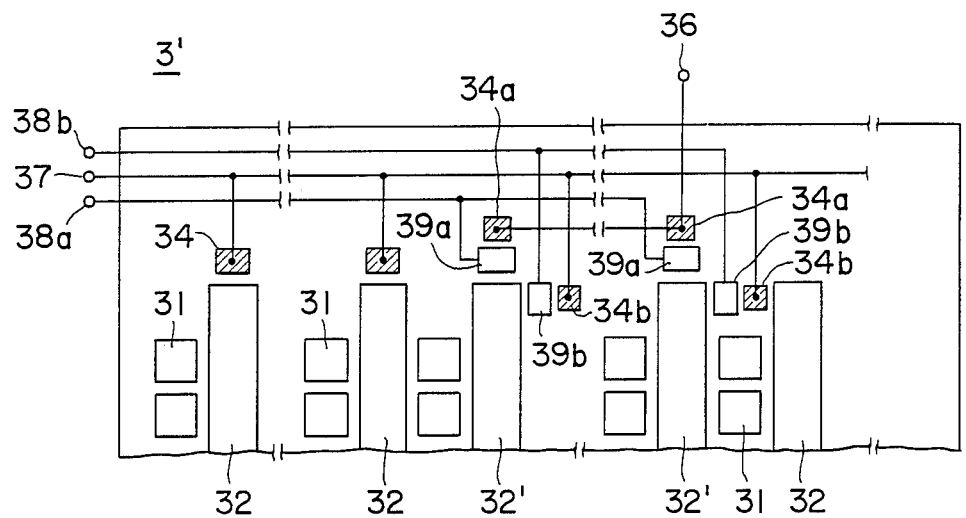
FIG. 6 is a view showing the structure of a solid state image sensor of a device according to a further embodiment of the present invention.

FIG. 6 is a view partially showing the structure of a solid state image sensor 3' employed in the electronic still camera according to this embodiment. In this device, a sweep-out terminal 37 and gate terminals 38a and 38b are newly provided and drains 34a and 34b are provided through gates 39a and 39b on the upper portion of vertical CCDs 32' positioned in the vicinity of the central portion. These gates 39a and 39b are subjected to the opening and closing control by voltages applied to gate terminals 38a and 38b, respectively.

The draining of charges in an upper direction in the figure in the device thus constructed will be conducted as follows. Initially, the gate 39a is closed and the gate 39b is opened to thereby transfer charges in the vertical CCDs 32 and 32' by one stage, thus to conduct draining of charges in an upper direction. As a result, all the charges are swept out from the sweep-out terminal 37. At the time point when the charges generated in the photosensitive pixels arranged upwardly have been swept out, the gate 39a is opened and the gate 39b is closed in turn, thereby continuing to transfer charges in an upper direction by one stage. Thus, charges from the vertical CCDs 32 on the left and right sides are still swept out from the sweep-out terminal 37. On the contrary, charges from the vertical CCDs 32' positioned in the vicinity of the central portion are output from the second terminal 36 through the drain 34a. When charges produced in the photosensitive pixels arranged in the vicinity of the central portion are thus output from the second terminal 36, the gate 39a is closed and the gate 39b is opened for a second time to thereby continuously transfer charges in the upper direction by one stage, thus to complete the transfer of charges in all the photosensitive pixels. When such a scheme is employed, it is possible to take out from the second terminal 36 only charges produced in the photosensitive pixels arranged in the vicinity of the central portion of the photosensitive pixels arranged on a two-dimensional plane, and to sweep out other or remaining charges from the sweep-out terminal 37.

Fourth Embodiment

Figure 7:
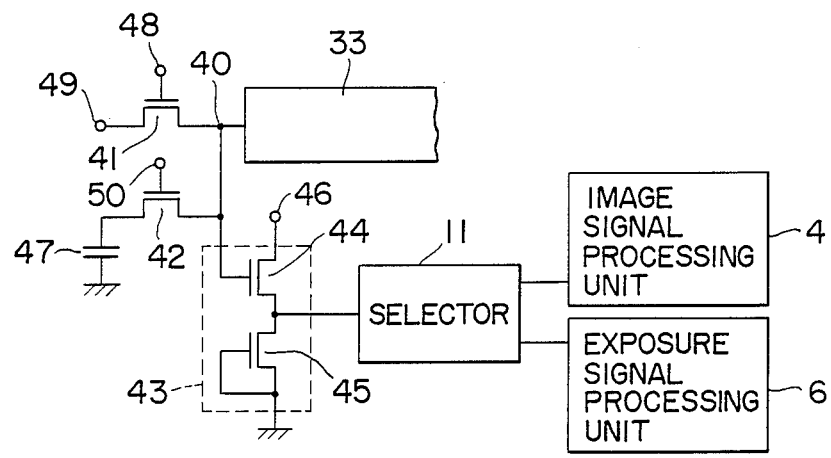
FIG. 7 is a view partially showing a device according to a still further embodiment of the present invention.

While the first terminal 35 for taking out a pictorial image signal and the second terminal 36 for taking out an exposure signal are provided to thereby take out both signals independently in the above-mentioned embodiments, an implementation may be employed such that a single common output terminal is provided in the solid state image sensor 3 to switch and deliver a signal from the single common output terminal to the image signal processing unit 4 or the exposure signal processing unit 6. A partial arrangement of such an embodiment is shown in FIG. 7. In this device, there is no need to provide the drains 34 and the second terminal 36 at the upper portion in the figure as having been required in the device in FIG. 2 and an ordinary solid state image sensor used in conventional electronic still cameras can be utilized. As shown in FIG. 7, charges which have been transferred from the horizontal CCD 33 toward the left direction in the figure are output to a common output terminal 40. To the common output terminal 40, MOS transistors 41 and 42 as well as an output buffer 43 are connected. The output buffer 43 comprises two MOS transistors 44 and 45 connected in series to deliver a signal proportional to charges output to the common output terminal 40 to a selector 11 by a power supply voltage delivered to the terminal 46. The selector 11 delivers this signal to either the image signal processing unit 4 or the exposure signal processing unit 6. in addition, a capacitor 47 is connected to the transistor 42.

The operation of this device is as follows. Initially, in the case of resetting and draining the charges output to the common output terminal 40, a predetermined voltage is applied to the gate terminal 48 to thereby turn the transistor 41 on, thus to drain them to a reset terminal 49. Further, in the case of utilizing the charges output to the common output terminal 40 as a pictorial image signal, the transistor 42 is cut off and a clock pulse is applied to the terminal 48, thus allowing the output buffer 43 to deliver a signal proportional to the charges on the terminal 40 to the selector 11. The selector 11 delivers an exposure signal to the image signal processing unit 4. On the other hand, in the case of utilizing the charges output to the common output terminal 40 as an exposure signal, the transistor 41 is cut off and the transistor 42 is turned on by the application of a predetermined voltage to the gate terminal 50 to connect the capacitor 47 to the terminal 40, thereafter allowing the output buffer 43 to deliver a signal proportional to the charges on the terminal 40 to the selector 11. The selector delivers this exposure signal to the exposure signal processing unit.

The reason why the capacitor 47 is connected in the case of handling the exposure signal is that a quantity of charges of the exposure signal becomes an extremely large value. Namely, because pictorial image signals are successively output in a manner of time-series with charges produced in individual photosensitive pixels being not mixed, respectively, only charges corresponding to one photosensitive pixel are accumulated at the most on the terminal 40. In contrast, since the exposure signal is output as a value obtained by mixing all the charges produced in a plurality of photosensitive pixels, charges produced in a large number of photosensitive pixels are all accumulated on the terminal 40. For this reason, in the case of handling the exposure signal, it is required to connect the capacitor 47 to thereby increase the capacity on the terminal 40.

What is claimed is:

1. An electronic still camera including:
    a solid state image sensor comprising a plurality of photosensitive pixels arranged on a two-dimensional plane, transfer means for transferring charges produced in said photosensitive pixels in a predetermined direction, and first and second terminals for outputting charges transferred by said transfer means;
        said transfer means comprising a plurality of vertical charge couple devices (CCDs) for transferring the charges produced in the respective pixels in a first direction and in a second direction opposite said first direction, a horizontal CCD for transferring the charges having been transferred in said first direction by said plurality of vertical CCDs in a third direction vertical to said first direction, and a drain for collecting charges having been transferred in said second direction by said vertical CCDs, said first terminal being connected to the terminating portion of said horizontal CCD, and said second terminal being connected to said drain;
    a shutter for controlling a light incident to said photosensitive pixels;
    an image signal processing unit for forming a pictorial image on the basis of the charges outputted from said first terminal of said solid state image sensor;
    an image recording unit for recording the pictorial image formed in said image signal processing unit;
    an exposure signal processing unit for determining an exposure time on the basis of the charges outputted from said second terminal of said solid state image sensor; and
    a control unit for controlling said transfer means of said solid state image sensor so as to output, from said second terminal, the charges produced in said photosensitive pixels for the exposure time period from a predetermined measurement start time after the shutter has been opened to a predetermined time at which a predetermined exposure measurement time elapses, and so as to output, from said first terminal, the charges produced in said photosensitive pixels for the exposure time period from a predetermined exposure start time subsequent thereto to a time in which the exposure time given by said exposure signal processing unit elapses.

2. An electronic still camera as set forth in claim 1, wherein said drain selectively collects only charges produced in the photosensitive pixels arranged in the vicinity of the central portion of said solid state image sensor.

3. An electronic still camera including:
    a solid state image sensor comprising a plurality of photosensitive pixels arranged on a two-dimensional plane, transfer means for transferring charges produced in said photosensitive pixels in a predetermined direction, and first and second terminals for outputting charges transferred by said transfer means;
        said transfer means comprises a plurality of vertical charge couple devices (CCDs) for transferring the charges produced in the respective pixels in a first direction and in a second direction opposite to said first direction, a horizontal CCD for transferring the charges having been transferred in said first direction by said plurality of vertical CCDs in a third direction vertical to said first direction, and a drain for collecting charges having been transferred in said second direction by said vertical CCDs, said first terminal being connected to the terminating portion of said horizontal CCD, and second terminal being connected to said drain;
    a shutter for controlling the light incident to said photosensitive pixels;
    an image signal processing unit for forming a pictorial image on the basis of the charges outputted from said first terminal of said solid state image sensor;
    an image recording unit for recording the pictorial image formed in said image signal processing unit;
    an exposure signal processing unit for determining an exposure time on the basis of the charges outputted from said second terminal of said solid state image sensor;
    a control unit for controlling said transfer means of said solid state image sensor so as to output, from said second terminal, the charges produced in said photosensitive pixels for the exposure time period from a predetermined measurement start time after the shutter has been opened to a predetermined time at which a predetermined exposure measurement time elapses, and so as to output from said first terminal, the charges produced in said photosensitive pixels for a time period from a predetermined exposure start time subsequent thereto to a time at which the exposure time given by said exposure signal processing unit elapses; and
    a display unit for displaying the exposure determined by said exposure signal processing unit.

4. An electronic still camera as set forth in claim 3, wherein said drain selectively collects only charges produced in the photosensitive pixels arranged in the vicinity of the central portion of said solid state image sensor.

* * * * *